United States Patent [19]

Wight

[11] 3,761,213

[45] Sept. 25, 1973

[54] CONFECTION EXTRUSION NOZZLE

[75] Inventor: Edward M. Wight, Austin, Tex.

[73] Assignee: Glacier Industries Inc., Austin, Tex.

[22] Filed: June 1, 1971

[21] Appl. No.: 148,414

[52] U.S. Cl. ............... 425/155, 425/133, 425/466, 425/465
[51] Int. Cl. ........................... A23g 5/03, B29f 3/12
[58] Field of Search ............... 425/461, 462, 466, 425/465, 161, 155, 131, 133, 376, 381

[56] References Cited
UNITED STATES PATENTS

| | | | |
|---|---|---|---|
| 1,715,859 | 6/1929 | Norton | 425/466 |
| 3,122,789 | 3/1964 | Coffee | 425/466 |
| 3,377,655 | 4/1968 | Kucharski | 425/466 |
| 3,134,832 | 5/1964 | Smith | 425/113 X |
| 2,425,237 | 8/1967 | Field | 425/461 X |

Primary Examiner—J. Spencer Overholser
Assistant Examiner—David S. Safran
Attorney—Kenway, Jenney & Hildreth

[57] ABSTRACT

An extrusion nozzle for manufacturing in a continuous flow process a variety of external shapes of frozen confections or the like. A portion of the periphery of the extrusion nozzle orifice is formed of a flexible deformable wall material, the shape of this wall being controlled by the state of actuation of a series of air cylinders which indent it when actuated. Individual internal features or an array of internal features may be moved to different lateral positions during manufacture.

10 Claims, 7 Drawing Figures

PATENTED SEP 25 1973
3,761,213
SHEET 1 OF 4

INVENTOR
EDWARD M. WIGHT
BY Kenway, Jenney & Hildreth
ATTORNEYS

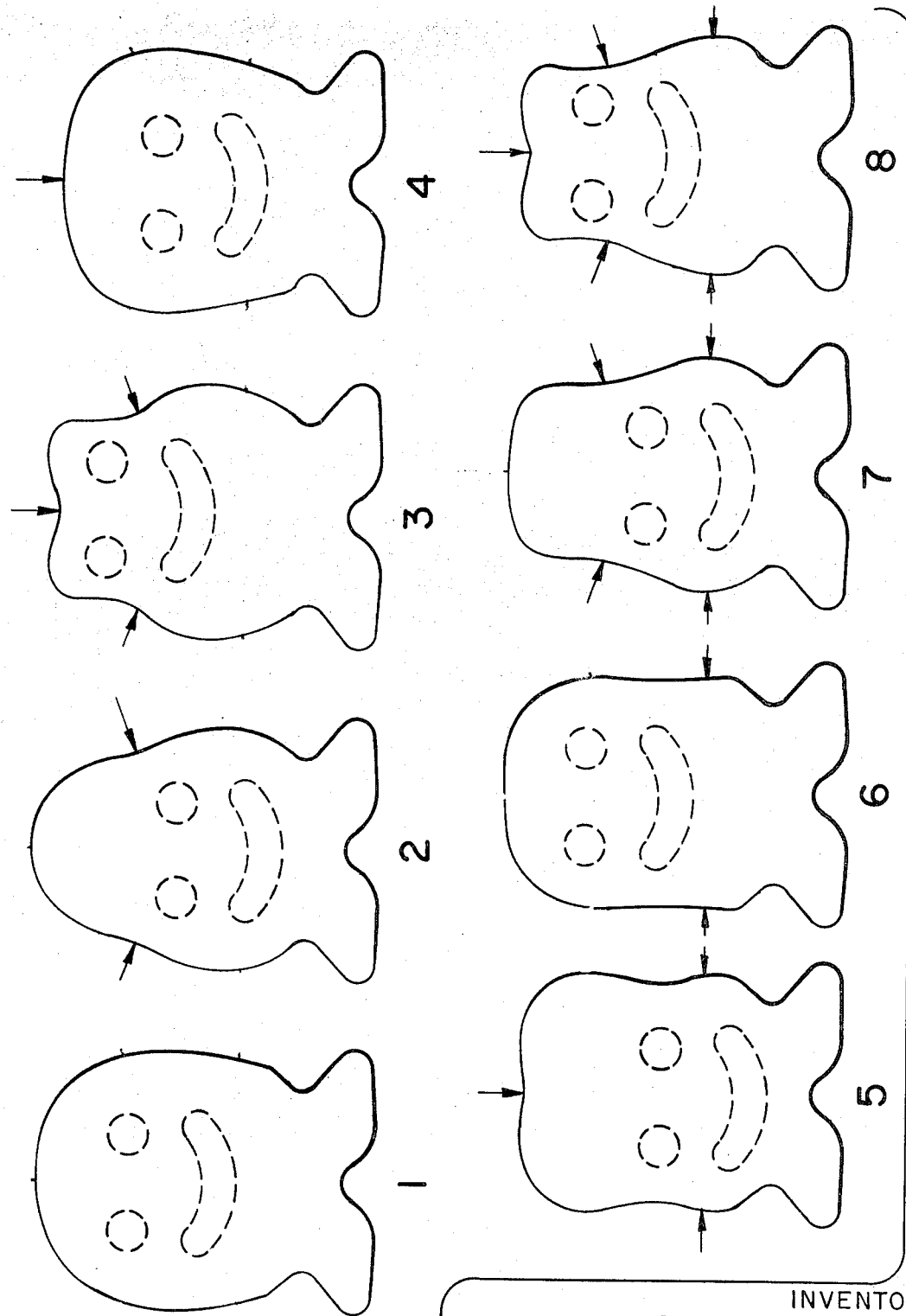

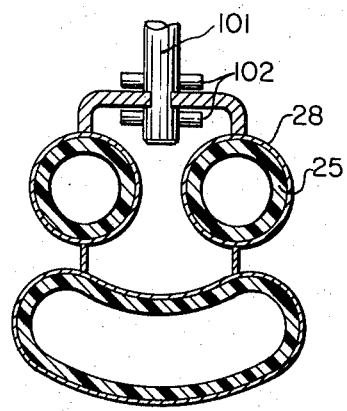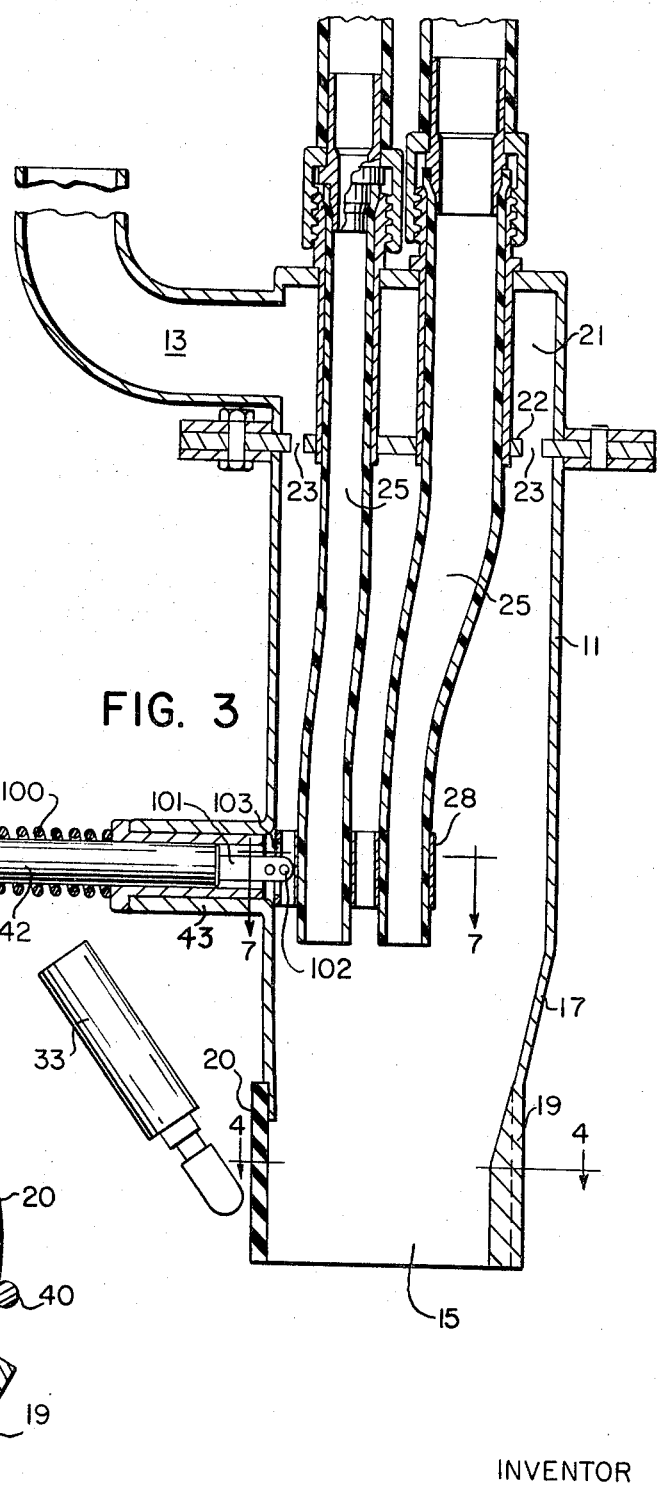

CONFECTION EXTRUSION NOZZLE

FIELD OF THE INVENTION

This invention relates in general to devices for making confections and more particularly to an extrusion nozzle for manufacturing, in a continuous process, frozen confections in a variety of shapes. The nozzle may also find use in the manufacture of non-frozen confections made by an extrusion process such as cookies.

BACKGROUND OF THE INVENTION

It is customary in manufacturing frozen confections such as ice cream novelties or the like to employ an extrusion process in which ice cream in a plastic or semi-soft state is forced through an extrusion nozzle with the external shape or configuration of the novelty being controlled by the shape of the nozzle orifice. Thus, if the novelty is to have the shape of a particular animal, a particular nozzle having the desired orifice shape is used and if the novelty is to have the shape, for example, of an airplane a different nozzle is used. Alternatively, the same nozzle may be used with replaceable dies. Generally the manufacturing process is a continuous one and a series of confections of the same shape are produced by extruding a portion of the cream through the nozzle and then cutting the extruded cream, with a hot wire cutter, for example, and then allowing the confection to fall on a conveyor plate. The process is completed by passing the semi-soft confection through a refrigeration cycle to hard freeze it and then it is directed to an automatic packaging machine.

Many of the frozen confections not only have a specific external shape or configuration, but also include an internal detail pattern, for example, animal features or airplane windows, these features being formed of ice cream flavors of different colors than the main body. One technique for producing such internal features employs within the main extrusion nozzle a set of tubular compartments which have a separate ice cream supply from the main extrusion chamber and which are supplied with ice cream of different colors from that supplied to the main extrusion chamber. In the manufacturing of the confection, the semisoft or plastic cream is forced through both the extrusion chamber main body and through the tubular compartments, forming a merged stream of confection which is characterized by an external shape corresponding to the external shape of the orifice of the extrusion nozzle and which has an internal pattern of contrasting colors as determined by the use of the internal tubular compartments.

In manufacturing confections in accordance with the technique described above, whenever it is desired to change the external shape of the confection, it is necessary to either replace the nozzle or to partially disassemble the extrusion chamber and replace the extrusion die at the orifice of the nozzle with one having a different shape or configuration. Similarly, if it is desired to change the configuration or location of the internal detailed pattern within the shape of the confection, it is necessary to disassemble the chamber and reposition the internal compartment. Not only does this necessity require interruption of the manufacturing process, but also it introduces limitations into the packaging process. For example, in the conventional process of manufacture, a large number of confections of the same shape and internal pattern are produced in the series and, if the manufacturing machine includes automatic packaging, then either each package must include all confections of the same shape or a more complex system, including sorting and storing prior to packaging must be introduced.

BRIEF SUMMARY OF THE INVENTION

Broadly speaking, the confection making device of this invention includes an extrusion nozzle in which a portion of the periphery of the nozzle is formed of a deformable flexible material, such as neoprene rubber, with the particular shape of this flexible portion of the nozzle orifice being controlled by the actions of a number of air cylinders positioned in an array around this flexible wall and interacting with the wall to indent the periphery and thus control the shape of the orifice. The air cylinders may be programmed to change the shape of the orifice into a series of specific configurations on a regular periodic basis so that the external shape of the confection produced by the nozzle is varied according to this program, without any disassembly of the machine or interruption of the manufacturing process. Alternatively the program may be a random program to produce random shapes.

The internal pattern within the confection may be provided by employing a series of tubular compartments arranged in a specific array within the main extrusion chamber. Each of these tubular compartments is supplied with ice cream of a color different from that supplied to the main extrusion chambers and the total area of the array of internal compartments is supplied with ice cream of a color different from that supplied to the main extrusion chambers and the total area of the array of internal compartments is selected to be less than the area of the total confection. These internal compartments may be held in fixed relationship with one another by means of a rigid harness, yet the total array is flexibly connected to the main chamber, either through the use of flexible tubes to connect to the ice cream supplies, or by making the compartments themselves out of a flexible material. By reason of this flexible mounting, the position of this subassembly array of compartments in the extrusion chamber may be moved in a plane transverse to the direction of flow of the cream. The position may be varied and controlled by means, for example, of an actuating plunger attached to the harness. Once again, by programming the position of this plunger to change in a predetermined time sequence, the position of the internal pattern within the confection may be varied from confection to confection in a manufacturing process, without interrupting the flow of the cream. It is also within the purview of this invention that the tubular compartments may be individually positioned by individually programmed actuators.

It will be apparent that with an extrusion nozzle as described, it is possible to produce a series of frozen confections having different external shapes and different positioning within the confections of a selected internal pattern or patterns. Accordingly, the confection may be routed directly from the extrusion nozzle, after cutting, through a hardening refrigeration cycle to a packaging cycle permitting inclusion in single packages of a variety of external shapes and with different positioning of internal patterns.

It is also apparent that novelties provided with the nozzle described may be either of the sticked or stickless type. In the case of the stickless type the novelty proceeds directly to the hardening cycle after being severed from the main stream whereas in the sticked case, a stick is inserted into the ice cream before the hardening cycle.

DESCRIPTION OF THE DRAWINGS

In the drawing:

FIG. 2 is an illustration in plan view of a few of the various outer shape configurations which may be made by the nozzle of FIG. 1;

FIG. 3 is a vertical cross-section of the nozzle of FIG. 1, the section being taken in slightly staggered planes to show the inner tubular compartment details with the details of the clamping device omitted for clarity;

FIG. 4 is a cross sectional view taken along the line 4—4 of FIG. 3 with actuator detail omitted for clarity;

FIG. 7 is a cross sectional view of an interior portion of the nozzle of FIG. 1 taken along line 7—7.

DESCRIPTION OF PREFERRED EMBODIMENT

Figure 1:
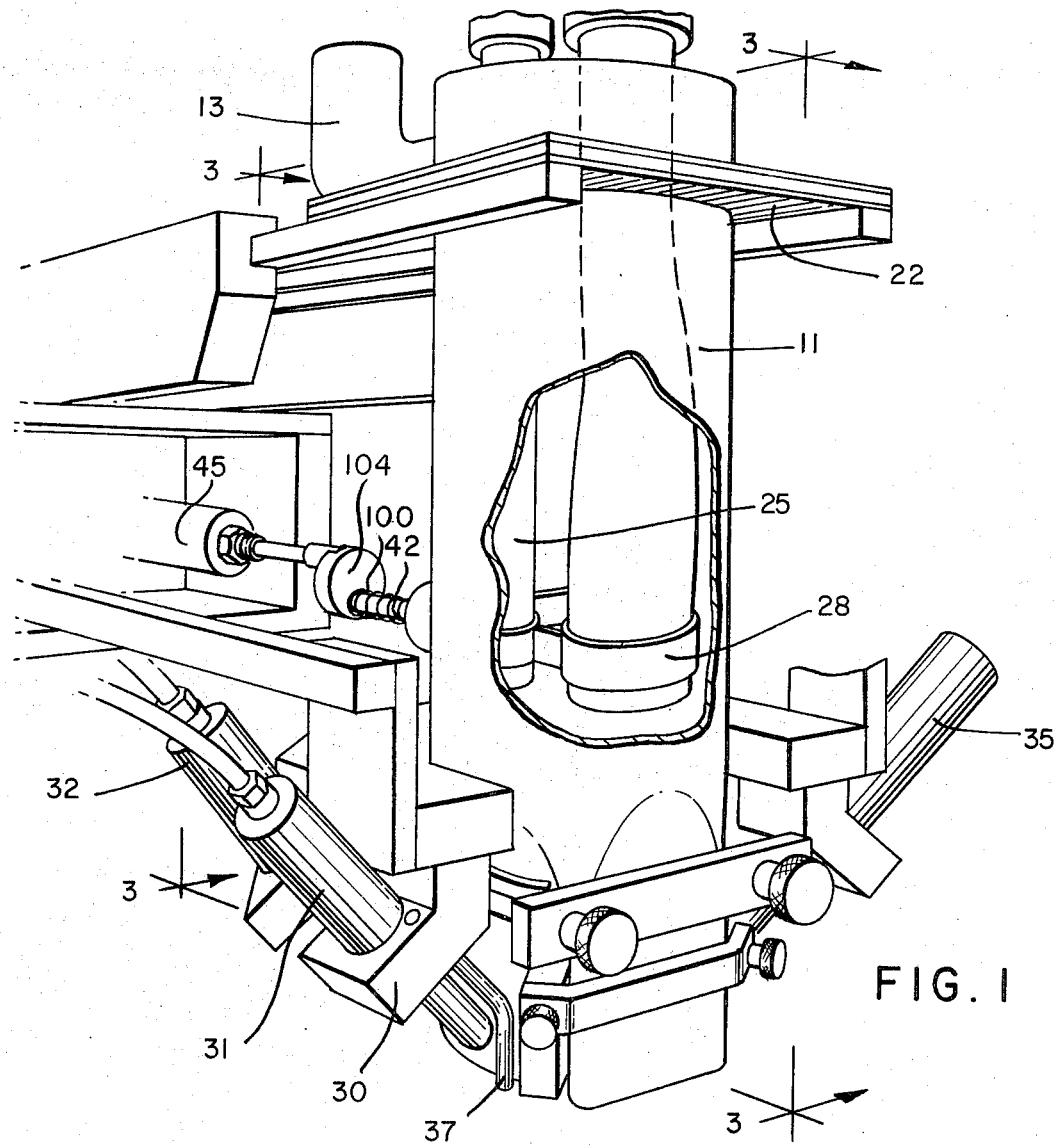
FIG. 1 is an illustration in perspective view of an extrusion chamber and nozzle constructed in accordance with the principles of this invention.

FIG. 1 is an illustration in perspective view of an ice cream extrusion nozzle constructed in accordance with the principles of the invention. A portion of that view has been broken away to show the details of the inner construction of the nozzle. This extrusion nozzle is intended to be employed in a continuous flow process in which ice cream in a semisoft or plastic state is flowed through the extrusion nozzle and the output stream from the nozzle is repetitively slice thereby producing a series of ice cream novelties which are then conveyed through a hard freezing refrigeration cycle and ultimately to a packaging machine. Machines of this general type, commonly referred to as "slice machines" are known in the art and are commercially available. For example, such a machine is currently manufactured by the Polarmatic Corporation of Austin, Texas under the designation "Model B-3 System".

Referring to FIG. 1, the nozzle is formed of a generally cylindrical extrusion chamber 11, fabricated, for example from stainless steel and including an inlet supply 13 for ice cream and terminating in an outlet orifice generally indicated at 15 and best seen in FIG. 3. The cylindrical body of the extrusion chamber 11 includes a tapered section 17 adjacent to outlet orifice 15. The orifice 15 has a peripheral wall formed in part by a metallic casting 19 (see FIG. 4) while the remainder is formed of a flexible wall 20, which would typically be formed of neoprene rubber. The neoprene rubber wall 20 may be attached in any convenient form to the casting, for example, by means of clamps.

As seen in FIG. 3, the upper portion of the extrusion chamber 11 is formed into a plenum chamber 21 by a distributor plate 22. The distributor plate 22 includes a series of openings 23 permitting the ice cream to flow for the plenum chamber 21 into the lower section of the extrusion chamber 11. This chamber also includes openings providing for the passage of a number of flexible tubes 25, which are held together at the lower ends by a yoke or harness 28. This array forms an internal extruding section of a particular pattern, shown here as two eyes and a mouth. As will be explained in more detail below, ice cream of contrasting color or colors to the cream applied through the main inlet 13 can be supplied to the tubing 25 to provide for a contrasting inner pattern in the produced confections. The harness 28 is typically formed of stainless steel sheet metal welded into the desired configuration. The tubing 25 would most usually be formed of polyvinyl chloride.

Figure 6:
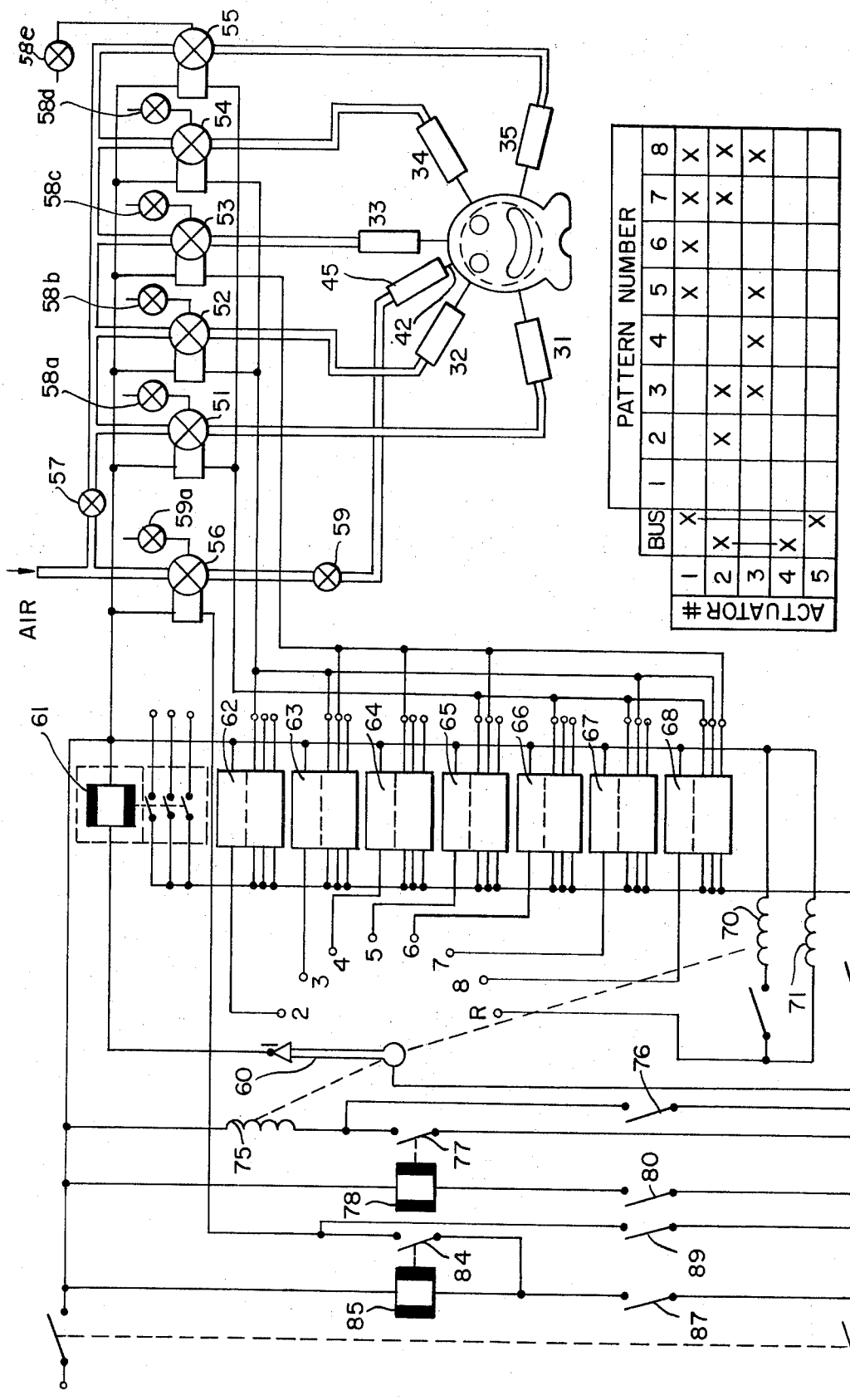
FIG. 6 is an illustration generally in schematic form of the electrical and control system for operating the nozzle of this invention.

The shape of the flexible portion 20 of the peripheral wall of the extrusion orifice 15 is controlled by an array of five air cylinders, 31, 32, 33, 34 and 35 which are mounted in a frame 30. The relative positions of the air cylinders are best seen in FIG. 6. The cylinders are so positioned that when deactuated they are not indenting the flexible wall 20 and when actuated they indent it to thereby vary the shape of the peripheral wall 20. It should be noted that the orifice wall sections 20 and 19 are not tapered, but are rather a generally cylindrical configuration of smaller total cross section than that of the main portion of the chamber 11. In addition to the air cylinders, the configuration of the flexible wall portion 20 of the extrusion chamber orifice is controlled by a series of four fixed pins 37, 38, 39 and 40, as seen in FIG. 4. These fixed pins prevent undesired flaring of the flexible wall portion 20, when its periphery is indented by actuation of the air cylinders.

The harness 28 is positioned within the chamber 11 by means of a spring loaded plunger subassembly 42 mounted in a collar 43 on the chamber 11. Depression of the plunger 42 varies the transverse or lateral position of the harness 28 and thereby varies the positioning of the internal detailed pattern within the resultant confections. The depression of the plunger 42 is effected by means of an additional air cylinder 45, which is controlled separately from the air cylinders indenting the peripheral wall of the extrusion chamber orifice chamber 15.

The cylinders used here have an adjustable stroke to vary the excursion of the inner array from zero up to the maximum stroke available on the cylinder, thus giving another degree of control over the appearance of the final product.

As earlier indicated the function of the nozzle illustrated in the drawing is to produce a series of frozen confections of different outer shapes and having the internal features positioned differently within those shapes. In order to accomplish this the air cyliners 31 through 35 are actuated according to a predetermined program thereby producing a predetermined cycle of different shapes. For purposes of description of the operation of the nozzle, the five air cylinders controlling the shape of the periphery of the nozzle orifice 15 will be described as being operated in a sequence in which cylinders 31 and 35 are always operated together as are cylinders 32 and 34. Cylinder 33 is actuated singly. It will be understood of course, that other program sequences may be used. The various combinations of actuation of the cylinders described above may produce the eight shapes illustrated in FIG. 2. The indenting air cylinders are shown in the form of arrowheads in that figure. In FIG. 2 various positions for the internal features on each of the shapes are shown in dotted form. The positioning of the internal features is entirely independent of the external shape and may be controlled in any desired fashion by a control applied to the harness plunger air cylinder 45.

In operation the semisoft ice cream is supplied through the main supply conduit 13 to the plenum chamber 21 and is forced through the openings 23 in the distribution plate, down through the extrusion chamber and out from the distribution plate, down through the extrusion chamber and out from the extrusion nozzle orifice 15. The openings 23 in the distribution plate 22 may be arranged in any convenient pattern that provides for relatively even flow of the semisoft cream throughout the extrusion chamber 11. The contrasting color or colors of ice cream are forced through the tubular sections 25 to form the internal feature pattern. The relationship between the three internal tubular sections 25 is fixed and only changes in the position in a transverse plane of this combination of features are made.

In order to control the shape of the outer periphery, each of the air cylinders 31 through 35 must be controlled according to a preset program. In FIG. 6 there is illustrated in schematic form an electrical circuit and a pneumatic circuit to control the position of the five air cylinders to produce the eight illustrated shapes of confection of FIG. 2. In FIG. 6 each of the air cylinders 31, 32, 33, 34 and 35 are shown as controlled by a respective solenoid operated air valve 51, 52, 53, 54 and 55 respectively. Such valves are commercially available, for example, under the designation TM-062E1-3-10-35(115/60) from Humphrey Products, Kalamazoo, Mich. These valves operate in response to an electrical signal to extend the piston portion of the corresponding air cylinder and upon removal of the actuating electrical signal this piston is returned to its retracted position by the action of a spring within the air cylinder, the air pressure being released through a bleeder valve to be described later. Suitable air cylinders for this purpose are also commercially available, for example, from the Bimba Manufacturing Company, Monee, Ill. Also illustrated in the pneumatic portion of the schematic of FIG. 6 is the air cylinder 45 controlling the harness plunger 42, this air cylinder being itself actuated by means of a solenoid air valve 56.

The rates of movements of all air cylinders are controlled by flow regulating means so that rates of extension and retraction are variable, producing smooth, continuous changes, if desired, instead of rapid movements usually encountered with air cylinders if no control is provided. The control of the rate of extension of cylinders 31 through 35 is provided by a needle valve 57 in the supply line to valves 51 through 55. The rate of retraction of cylinders 31 through 35 is controlled by individual needle valves associated with each cylinder 58a through 58e in the exhaust ports of valves 51 through 55. In a like manner, the rate of extension and retraction of cylinder 45 is controlled by flow control valve 59 and needle valve 59a respectively.

The relationship between the actuation of the air cylinders 31 through 35 and the patterns illustrated in FIG. 2 is shown by the table included in FIG. 6. As indicated in that figure for purposes of illustration, air cylinders 32 and 34 are actuated together, as are air cylinders 31 and 35. Thus, pattern 1 of FIG. 2 is one in which none of the air cylinders are actuated and there is no indentation of the flexible peripheral portion of the extrusion nozzle orifice. Similarly, in pattern 2, cylinders 32 and 34 are actuated, while in pattern 3 the cylinders 32, 33 and 34 are actuated. The remainder of the patterns illustrated in FIG. 2 are also produced according to the actuation chart in FIG. 6.

FIG. 6 also includes a schematic illustration of the electrical control system for controlling the air valves. This electrical circuit includes a coil operated stepping switch 60 having nine switch terminals designated 1 through 8 and R. Terminal R is a reset terminal which actuates coils to return the movable arm of switch 60 to the 1 terminal. Each of the terminals 1 through 8 is connected to a respective relay having three sets of normally open contacts. Preferably, the stepping switch has bridging contacts which permit smooth transition between patterns without a momentary de-energization of the air valve occurring. The arrangement of this relay is illustrated in relay 61 which is connected to terminal 1 of the stepping switch 60. For convenience the internal details have been omitted from the remainder of the relays 62 through 68. However, each of these relays is identical to relay 61. Terminal R of stepping switch 60 is connected to actuate a pair of coils 70 and 71, each of which is positioned to move the stepping switch 60 movable arm. Thus coil 70 rotates the arm back from the R terminal to the 1 terminal, while coil 71 lifts the arm out of contact during this rotation, thereby avoiding any electrical contacts being made on this return path. Conventional auxiliary contacts and apparatus, not illustrated, are provided in association with coils 70 and 75 to insure that the foregoing operation is obtained. The electrical contacts of each one of the relays 61 through 68 are connected to the solenoids controlling the air valves 51 through 55 such that when the arm of stepping switch 60 is connected to any one of the terminals 61 through 68 it produces a corresponding one of the patterns 1 through 8.

The normal sequencing of the stepping switch 60 is controlled by means of a stepping coil 75. This coil 75 can be actuated either through a manual switch 76 or more usually through a relay actuated switch 77 controlled by relay coil 78. The relay coil 78 is energized by an automatically timed switch 80 whose closure is timed by any conventional repetive timing device.

Harness actuating air cylinder 45 has its solenoid valve 56 energized directly from a solenoid actuated contact 84 for control by solenoid coil 85. This latter coil is again energized in a predetermined cycle by means of an automatically timed switch 87. Alternatively the air solenoid 56 may be energized by closing a manually operated switch 89. The program for varying the position of the harness may be established on any convenient basis. It may be that the harness will be moved more or less constantly or according to a random cycling to produce any one of many positions of the harness within the chamber.

It is apparent that the bussing between valves 51 and 55 and that between 52 and 54 as well as all of the output wiring from the contacts in relays 61 through 68 which determines the program described illustrates only the eight patterns chosen for this particular example. These patterns happen to produce symetric shapes. This wiring may be changed so that any given pattern number can energize any three of the 5 actuators, including those which would produce non-symetric shapes. The number of patterns to be run before reset can also be less than the eight shown by moving the reset contact R on the stepping switch back to a lower number.

In the construction of the extrusion nozzle illustrated in the drawing, it is important that the overall nozzle be capable of ready disassembly and that the materials forming the nozzle be capable of readily being cleaned to be made sterile. In operation of an ice cream machine of this general type, it is necessary to thoroughly and completely clean all of the internal parts at least once a day. Suitable materials for fabricating this nozzle are polyvinyl chloride tubing, neoprene rubber and stainess steel.

Figure 5:
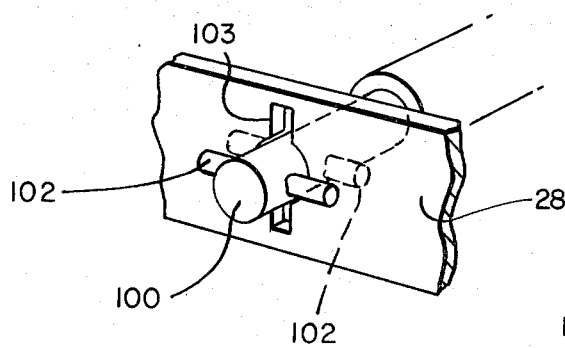
FIG. 5 is a detailed illustration of a portion of the nozzle of FIG. 1.

In FIGS. 3 and 5 there is illustrated in detail the construction for the plunger 42 controlling the position of the harness 28. For cleaning purposes this actuating plunger must be capable of being readily disassembled from the harness. The plunger includes a barrel 100 which terminates in a pin 101 having a smaller diameter portion including a pair of cross pins 102 which lock with a 90° turn in a key slot 103 in the harness. The other end of the barrel 100 is formed as a slotted head 104. The barrel of the air cylinder 45 must be positioned in this slot so that it is off-center from the center of head 104. With this configuration, there can be no rotation of the plunger 42, once the air cylinder is engaged in the slot and hence the plunger will not become detached from the harness 28 during operation. On the other hand, by retracting the entire subassembly of the air cylinder 45 the plunger may be readily rotated and disassembled for cleaning purposes.

It will thus be apparent that I have provided an extrusion nozzle for use with frozen confections which can produce a wide variety of peripheral shapes which may be varied as the nozzle is in use. The nozzle of the invention also provides for movement of details or features of a pattern included within the periphery during the extrusion process.

It will of course be understood that the shapes shown in FIG. 2 and described above are illustrative only of the many shapes which may be obtained with the nozzle of my invention. It will also be understood that if, as is desirable, the air cylinder actuators are adjusted to move smoothly and relatively slowly as extrusion is taking place, shapes intermediate those shown in FIG. 2 above will be obtained.

In the preferred embodiment described above the actuating means for the deformable portion of the nozzle are air cylinders. Other types of mechanical actuators or electro-mechanical actuators could also be used, including solinoids, cams, etc. to deform the deformable portion of the nozzle outlet orifice. Further, although I have described the actuators as pushing on the deformable peripheral wall of the nozzle, in some instances it may be desirable to pull on the wall rather than push on it.

As has been mentioned above, the programming has been illustrated for a particular situation to provide eight different symetric shapes. Many other and different programs are of course possible which would produce symetric and non-symetric shapes.

The nozzle of my invention is adapted to making either stickless confections or sticked confections. If sticked confections are desired, the stick would be inserted as the confection is being extruded or immediately thereafter before it has been passed through the freezing vault in any conventional manner.

While I have described my invention with particular reference to frozen confections made from ice cream, I intend to include confections made of sherbert, ice-milk, mellormine and like materials. In addition, it is to be understood that the ice cream of different flavor which forms the feature of the pattern may be similar materials of different color or may also be liquid confections of other types such as chocolate, toffee and like materials. Further, it will be apparent the nozzle of my invention may be used with other extrudable materials such as, for example, extrudable, cookie cough.

Having thus described my invention, I claim:

1. An extrusion nozzle for forming food products comprising,
   a nozzle body having an inlet end and an outlet end, and being formed in a generally cylindrical shape, the peripheral edge of said outlet end defining the shape of food products extruded through said nozzle, at least a portion of the periphery of said outlet end being formed of a flexible deformable material,
   movable mechanical means positioned to interact with said flexible portion of the outlet end of said extrusion nozzle and to vary the shape of the periphery of said nozzle, wherein said mechanical means are formed of a plurality of mechanical actuators positioned around said flexible portion of the outlet of said extrusion nozzle such that in an actuated position said mechanical actuators interact with the periphery of said nozzle; and
   programmable means for actuating said plurality of mechanical actuators in individual combinations.

2. A device in accordance with claim 1 further including a generally tubular compartment mounted within said extrusion nozzle and terminating in an orifice in a plane between said inlet and said outlet end of said nozzle, said tubular compartment having a cross sectional area in a plane transverse the direction of flow of said confection smaller than the cross sectional area of said extrusion nozzle in the plane of the orifice of said tubular compartment.

3. An extrusion nozzle in accordance with claim 2 wherein a portion of the periphery of said outlet end is formed of a rigid inflexible material having a predetermined shape.

4. A nozzle in accordance with claim 3 wherein said flexible deformable material is rubber and said rigid inflexible material is stainless steel.

5. A nozzle in accordance with claim 1 and further including a plurality of fixed pins positioned around said flexible portion of the outlet of said extrusion in contact therewith.

6. A nozzle in accordance with claim 1 wherein said mechanical actuators are air cylinders and wherein said programmable means include means for regulating the rate of extension and retraction of said air cylinders and wherein said programmable means calls for substantially continuous varying of the positions of at least some of said air cylinders.

7. A nozzle in accordance with claim 1 wherein there are five mechanical actuators positioned around said flexible portion of the outlet of the extrusion nozzle.

8. An extrusion nozzle for forming frozen confections having a variable outer shape comprising,
   a generally cylindrical extrusion chamber having an inlet end and an outlet end,
   an extrusion shaping element attached to said outlet end, said extrusion shaping element having at least a portion of its periphery formed of a flexible deformable material, the external shape of said frozen confection being formed by the shape of the periphery of said element, a plurality of mechanical actuators positioned to interact with the flexible portion of said element according to a predetermined program to thereby vary the peripheral shape of said element; and programmable means for actuating said plurality of mechanical actuators in individual combinations.

9. A nozzle in accordance with claim 8 wherein said extrusion shaping element is of a generally smaller diameter than the diameter of said generally cylindrical extrusion chamber and wherein said generally cylindrical extrusion chamber tapers at its outlet end to merge into the extrusion shaping element.

10. A nozzle in accordance with claim 9 wherein a portion of the periphery of said extrusion shaping element is formed of a rigid non-flexible material having a predetermined shape.

* * * * *

UNITED STATES PATENT OFFICE
CERTIFICATE OF CORRECTION

Patent No. 3,761,213          Dated September 25, 1973

Inventor(s) Edward M. Wight

It is certified that error appears in the above-identified patent and that said Letters Patent are hereby corrected as shown below:

Column 2, lines 30-33 reading:

"area of the array of internal compartments is supplied with ice cream of a color different from that supplied to the main extrusion chambers and the total area of the array of internal compartments is selected to be less"

Should read:

--area of the array of internal compartments is selected to be less--;

Column 5, lines 5-6 reading:

"chamber and out from the distribution plate, down through the extrusion chamber and out from the extru-"

Should read:

--chamber and out from the extru- --

Claim 3; in Column 8, line 39 reading:

"An extrusion nozzle in accordance with claim 2"

Should read:

--An extrusion nozzle in accordance with claim 1--

UNITED STATES PATENT OFFICE
CERTIFICATE OF CORRECTION

Patent No. 3,761,213         Dated September 25, 1973

Inventor(s) Edward M. Wight

It is certified that error appears in the above-identified patent and that said Letters Patent are hereby corrected as shown below:

Column 4, line 48 reading:

"shapes. In order to accomplish this the air cyliners 31"

Should Read:

--shapes. In order to accomplish this the air cylinders 31--

Column 6, line 42 reading:

"timed by any conventional repetive timing device."

Should Read:

--timed by any conventional repetitive timing device.--

Column 6, line 60 reading:

"ple. These patterns happen to produce symetric shapes."

Should Read:

--ple. These patterns happen to produce symmetric shapes.--

Column 6, line 63 reading:

"cluding those which would produce non-symetric"

UNITED STATES PATENT OFFICE
CERTIFICATE OF CORRECTION

Patent No. 3,761,213     Dated September 25, 1973

Inventor(s) Edward M. Wight

It is certified that error appears in the above-identified patent and that said Letters Patent are hereby corrected as shown below:

Should Read:

--cluding those which would produce non-symmetric--

Column 7, line 10 reading:

"stainess steel."

Should Read:

--stainless steel.--

Column 7, line 48 reading:

"cluding solinoids, cams, etc. to defrom the deformable"

Should Read:

--cluding solenoids, cams, etc. to deform the deformable--

Column 7, line 56 reading:

"eight different symetric shapes. Many other and differ-"

Should Read:

--eight different symmetric shapes. Many other and differ- --

UNITED STATES PATENT OFFICE
CERTIFICATE OF CORRECTION

Patent No. 3,761,213      Dated September 25, 1973

Inventor(s) Edward M. Wight

It is certified that error appears in the above-identified patent and that said Letters Patent are hereby corrected as shown below:

Column 7, line 58 reading:

"duce symetric and non-symetric shapes."

Should Read:

"duce symmetric and non-symmetric shapes.--

Column 8, line 8 reading:

"rials such as, for example, extrudable, cookie cough."

Should Read:

--rials such as, for example, extrudable, cookie dough.--

Signed and sealed this 16th day of April 1974.

(SEAL)
Attest:

EDWARD M. FLETCHER, JR.
Attesting Officer

C. MARSHALL DANN
Commissioner of Patents